(12) United States Patent
Kamerman et al.

(10) Patent No.: US 12,372,619 B2
(45) Date of Patent: Jul. 29, 2025

(54) POLARIZATION SENSITIVE LiDAR SYSTEM

(71) Applicant: LG INNOTEK CO., LTD., Seoul (KR)

(72) Inventors: Gary W. Kamerman, Plainsboro, NJ (US); Christopher John Trowbridge, Dexter, MI (US); Viorel C. Negoita, Plainsboro, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/590,470

(22) Filed: Feb. 28, 2024

(65) Prior Publication Data
US 2024/0201329 A1 Jun. 20, 2024

Related U.S. Application Data

(63) Continuation of application No. 17/664,178, filed on May 19, 2022, now Pat. No. 11,947,039, which is a
(Continued)

(51) Int. Cl.
G01C 3/08 (2006.01)
G01S 7/48 (2006.01)
(Continued)

(52) U.S. Cl.
CPC ........... G01S 7/4811 (2013.01); G01S 7/4802 (2013.01); G01S 7/4815 (2013.01); G01S 7/499 (2013.01); G01S 17/06 (2013.01); G02B 27/10 (2013.01)

(58) Field of Classification Search
CPC .... G01S 7/4811; G01S 7/4802; G01S 7/4815; G01S 7/499; G01S 17/06; G02B 27/10
See application file for complete search history.

(56) References Cited

U.S. PATENT DOCUMENTS 5,192,978 A   3/1993 Keeler
5,900,975 A   5/1999 Sussman
(Continued)

FOREIGN PATENT DOCUMENTS

DE   102015200027 A1   7/2016
DE   102016201599 A1 * 8/2017 ............. G01S 7/493
(Continued)

OTHER PUBLICATIONS

Hassebo, Y.Y. et al., "Polarization discrimination technique to maximize LIDAR signal-to-noise ratio for daylight operations," Optical Remote Sensing Laboratory—The City College of the City University of New York.
(Continued)

*Primary Examiner* — Mark Hellner
(74) *Attorney, Agent, or Firm* — Birch, Stewart, Kolasch & Birch, LLP

(57) ABSTRACT

A light detection and ranging (LiDAR) system including a plurality of light emitters, wherein the plurality of light emitters are configured to emit a plurality of beams, and the plurality of light emitters are configured to form a beam polarization pattern of the plurality of beams to be emitted toward an object external to the LiDAR system, a receiver that is configured to receive light reflected from the object, and an analyzer that comprises a processor and programming instructions that are configured to cause the processor to determine characteristic differences between the beam polarization pattern of the beams emitted toward the object and an intensity pattern of the light reflected from the object, determine a reflection position that is associated with the light reflected from the object, and use the determined characteristic differences to determine whether the reflection position is a position of the object or a position of a ghost.

13 Claims, 8 Drawing Sheets

Related U.S. Application Data continuation of application No. 16/385,048, filed on Apr. 16, 2019, now Pat. No. 11,402,472.

(51) Int. Cl.
  *G01S 7/481*  (2006.01)
  *G01S 7/499*  (2006.01)
  *G01S 17/06*  (2006.01)
  *G02B 27/10*  (2006.01)

(56) References Cited

U.S. PATENT DOCUMENTS

| | | |
|---|---|---|
| 6,163,379 A | 12/2000 | de Groot |
| 7,580,127 B1 | 8/2009 | Mayor et al. |
| 8,115,925 B1 | 2/2012 | Mathur et al. |
| 9,971,150 B1 | 5/2018 | Robbins |
| 10,018,725 B2 | 7/2018 | Liu |
| 10,018,726 B2 | 7/2018 | Hall et al. |
| 10,181,200 B1 | 1/2019 | Chao et al. |
| 11,402,472 B2 | 8/2022 | Negoita et al. |
| 2014/0247357 A1 | 9/2014 | Sekiguchi |
| 2016/0178736 A1 | 6/2016 | Chung |
| 2016/0363669 A1 | 12/2016 | Liu |
| 2017/0299697 A1 | 10/2017 | Swanson |
| 2017/0350983 A1 | 12/2017 | Hall et al. |
| 2018/0081031 A1 | 3/2018 | Yuan |
| 2018/0156895 A1 | 6/2018 | Hinderling et al. |
| 2018/0267151 A1 | 9/2018 | Hall et al. |
| 2018/0275274 A1 | 9/2018 | Bao et al. |
| 2020/0033477 A1* | 1/2020 | Scaggs ............. H01L 27/14629 |
| 2020/0249326 A1* | 8/2020 | Bhaskaran ............ G01S 7/4815 |
| 2021/0389436 A1 | 12/2021 | Johnson |

FOREIGN PATENT DOCUMENTS

| | | |
|---|---|---|
| EP | 3182158 A1 | 6/2017 |
| JP | 7-134026 A | 5/1995 |
| KR | 10-2015-0009177 A | 1/2015 |
| KR | 10-2015-0027543 A | 3/2015 |
| WO | WO2018/055449 A2 | 3/2018 |

OTHER PUBLICATIONS

Node.js—Event Loop tutorial, https://www.tutorialspoint.com/nodejs/nodejs_event_loop.htm, printed Jan. 12, 2019.

Richmond, R.D. et al., "Polarimetric Imaging Laser Radar (PILAR) Program," Advanced Sensory Payloads for UAV, pp. 19-1-19-14, Meeting Proceedings RTO-MP-SET-092, paper 19, 2005.

Scheduling Calls to Regular Functions —PyMOTW3 webpage, https://pymotw.com/3/asyncio/scheduling.html, printed Jan. 12, 2019.

The Node.js Event Loop, Timers, and process.nextTick() webpage, https://nodejs.org/en/docs/guides/event-loop-timers-and-nexttick/, printed Jan. 12, 2019.

* cited by examiner

POLARIZATION SENSITIVE LiDAR SYSTEM

CROSS-REFERENCES TO RELATED APPLICATIONS

This application is a Continuation of U.S. application Ser. No. 17/664,178, filed on May 19, 2022, which is a continuation of U.S. application Ser. No. 16/385,048, filed on Apr. 16, 2019 (U.S. Pat. No. 11,402,472 issued Aug. 2, 2022).

BACKGROUND

Light detecting and ranging (LiDAR) systems are used in various applications. One application for LiDAR systems is autonomous vehicles. Autonomous vehicles may use LiDAR systems to measure the distance from the autonomous vehicle to surrounding objects. To accomplish this task, the LiDAR system illuminates an object with light and measures the reflected light with a sensor. The reflected light is used to determine features of the object that reflected it and to determine the distance the object is from the autonomous vehicle. LiDAR systems also may be used in other applications, such as in aircraft, ships, mapping systems, and others.

An issue with many LiDAR systems is that light can be reflected from multiple surfaces and/or objects, creating appearances of objects at the wrong location. For example, as illustrated in FIG. 1, light may be emitted from an emitter of a LiDAR system 101 toward a surface of an object 102 which in this example is the hood of a vehicle. The light may be reflected from that surface to another object 103 (in this case a pipe in a ceiling), back to the surface of the first object 102, and then to the receiving sensor of the LiDAR system 101. When this occurs, as shown in FIG. 1, it creates the appearance to the LiDAR of the object 103 being in a different location 104. In other words, it creates what may be referred to as a "ghost". These ghosts result in the LiDAR system being less reliable.

This document describes a polarization sensitive LiDAR system and method that is directed to solving the issue described above, and/or other issues.

SUMMARY

In various embodiments, a light detection and ranging (LiDAR) system includes a group of light emitters that are configured to emit a plurality of beams of light. The light emitters are configured to form a beam polarization pattern and are positioned to be emitted toward an object external to the LiDAR system. The LiDAR system also will include a receiver to receive light reflected from the object. The LiDAR system also will include an analyzer that has a processor and programming instructions that are configured to cause the processor to determine characteristic differences between the beam polarization pattern of the beams emitted toward the object and an intensity pattern of the light reflected from the object, determine a reflection position that is associated with the light reflected from the object, and use the determined characteristic differences to determine whether the reflection position is a position of the object or a position of a ghost.

In various embodiments, each of the light emitters may be configured to emit a beam of polarized light that exhibits a polarization. For example, each of the light emitters may include a laser emitter, and each beam of polarized light may be a polarized laser beam.

In various embodiments, the LiDAR system may include a polarization modifier that is configured to modify the polarization of at least a portion of the plurality of beams to create the beam polarization pattern. For example, the polarization modifier may include half-wave plates or quarter-wave plates, each of which is positioned in a path of a beam emitted by one of the light emitters. Alternatively, the polarization modifier may comprise filters or mirrors, each of which is positioned in a path of a beam emitted by one of the light emitters. The half-wave plates, quarter-wave plates, filters or mirrors also may be positioned in the paths for some but not all of the light emitters.

In some embodiments, a first portion of the light emitters may be mounted in a first orientation within a housing of the LiDAR system. A second portion of light emitters may be mounted within the housing in a second orientation that is different from the first orientation, such as being perpendicular to each other (as in a relatively vertical/horizontal orientation). Optionally, the first portion and the second portion may include equal numbers of light emitters.

In some embodiments, the receiver may include a polarization beam splitter configured to split received light into vertical and horizontal polarizations.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required. As used in this document, the term "light" means electromagnetic radiation associated with optical frequencies, e.g., ultraviolet, visible, infrared and terahertz radiation. Example emitters of light include laser emitters and other devices that emit light. In this document, the term "emitter" will be used to refer to an emitter of light, such as a laser emitter that emits infrared light.

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation. This, when two items are referred to as being generally "vertical" and "horizontal" they are not necessarily so oriented with respect to ground unless specifically stated, but instead are oriented perpendicularly with respect to each other.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The present disclosure generally relates to a polarization sensitive LiDAR system. References to various embodiments and examples set forth in this specification do not limit the scope of the disclosure and merely set forth some of the many possible embodiments of the appended claims.

Figure 1:
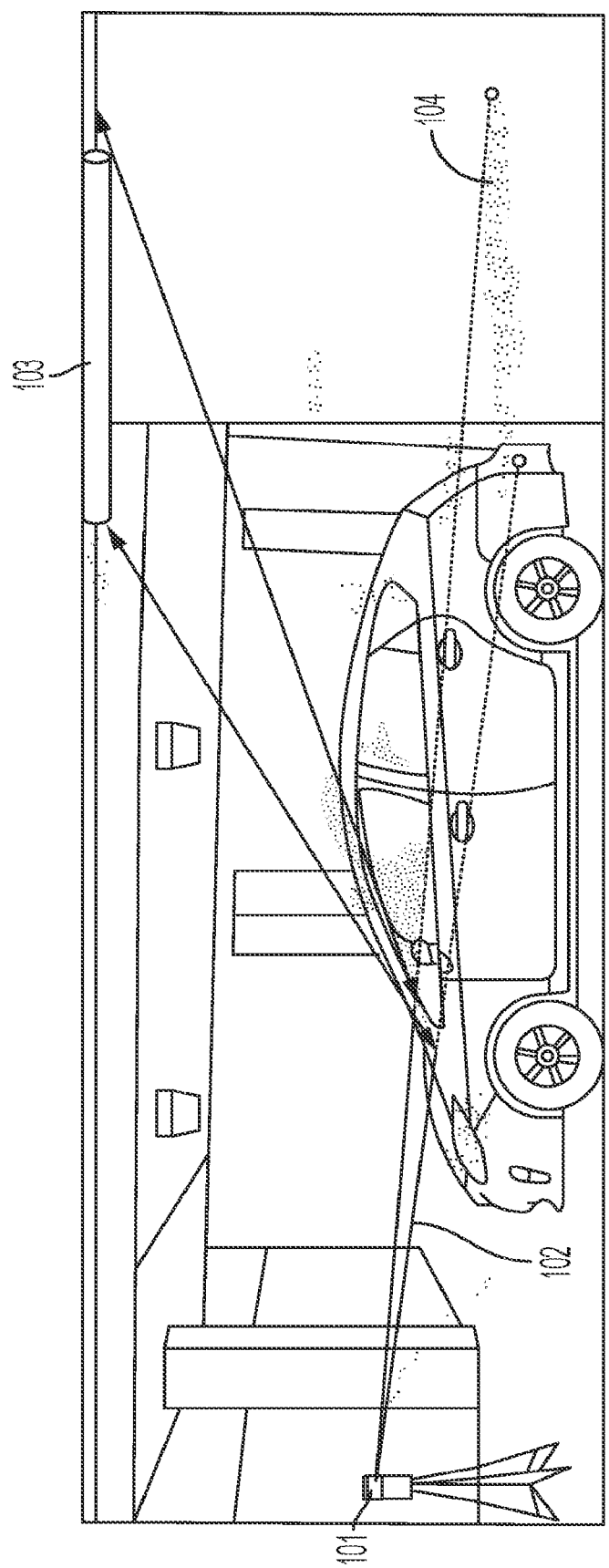
FIG. 1 illustrates how a LiDAR system may detect a ghost in addition to (or instead of) a real object.
Figure 2:
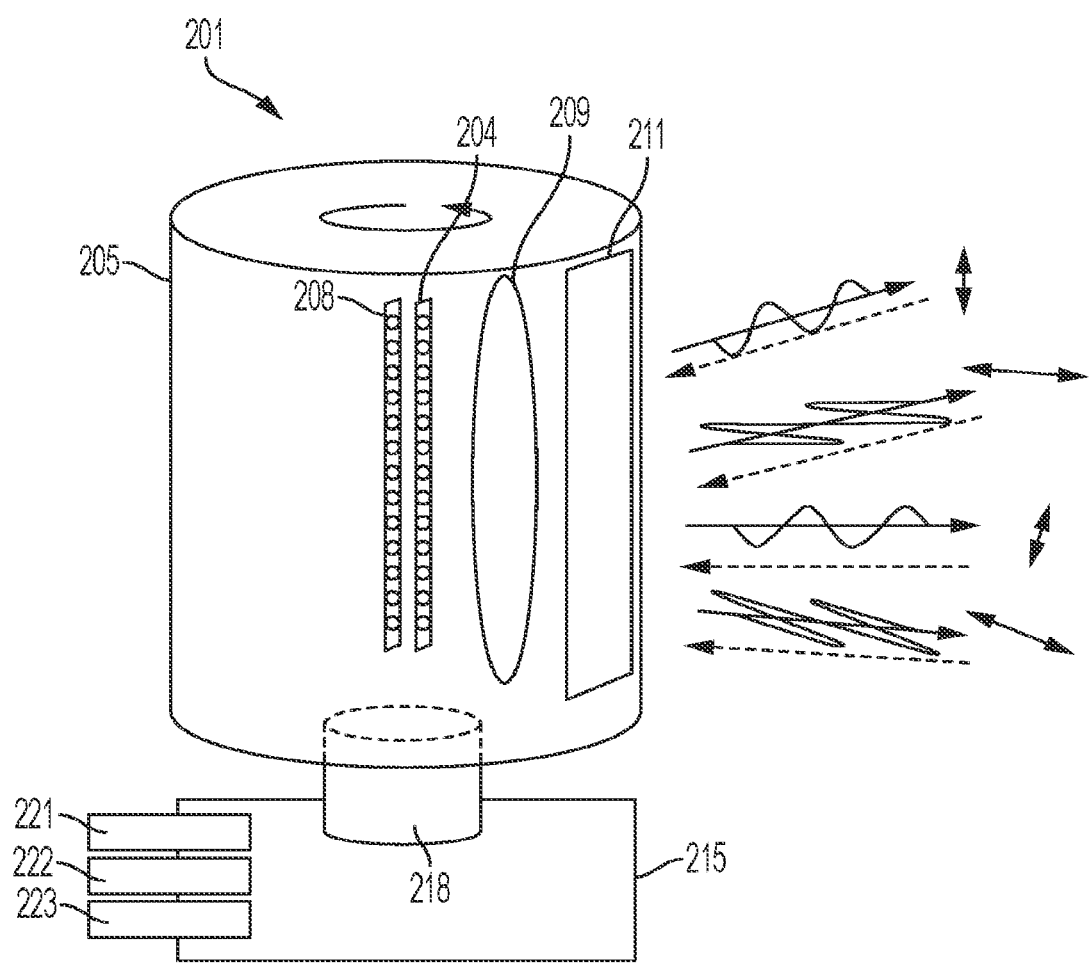
FIG. 2 illustrates example elements of a LiDAR system.

FIG. 2 shows an example LiDAR system 201 as may be used in various embodiments. As shown in FIG. 2, the LiDAR system 201 includes a housing 205 which may be rotatable 360° about a central axis such as hub or axle 218. The housing may include an emitter/receiver aperture 211 made of a material transparent to light. Although the example shown in FIG. 2 has a single aperture, in various embodiments, multiple apertures for emitting and/or receiving light may be provided. Either way, the system can emit light through one or more of the aperture(s) 211 and receive reflected light back toward one or more of the aperture(s) 211 as the housing 205 rotates around the internal components. In an alternative embodiment, the outer shell of housing 205 may be a stationary dome, at least partially made of a material that is transparent to light, with rotatable components inside of the housing 205.

Figure 3A:
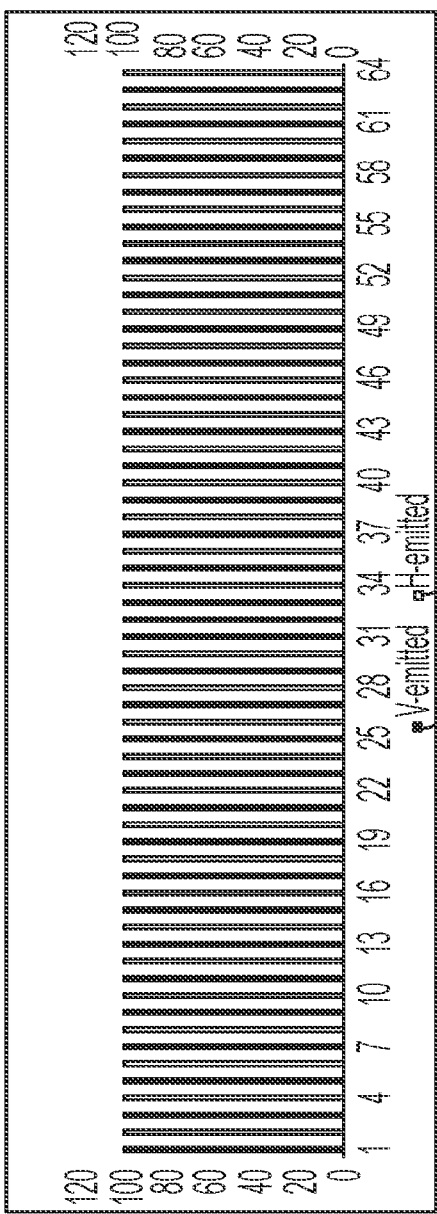
FIG. 3A illustrates an example of emitter laser beams with interleaved polarization states.

Inside the rotating shell or stationary dome is a light emitter system 204 that is configured and positioned to generate and emit pulses of light through the aperture 211 or through the transparent dome of the housing 205 via one or more laser emitter chips or other light emitting devices. The emitter system 204 may include any number of individual emitters, including for example 8 emitters, 64 emitters or 128 emitters. The emitters may emit light of substantially the same intensity, or of varying intensities. The individual beams emitted by 204 will have a well-defined state of polarization that is not the same across the entire array. As an example, some beams may have vertical polarization and other beams may have horizontal polarization. FIG. 3A shows an example of arrangement of emitted laser beams where odd beams have vertical polarization 301 and even number of beams have horizontal polarization 302. Other patterns are also possible. Other states of polarization, such as left hand circular or right hand circular polarization, are also possible.

Returning to FIG. 2, the LiDAR system will also include a light detector 208 containing a photodetector or array of photodetectors positioned and configured to receive light reflected back into the system. The emitter system 204 and detector 208 would rotate with the rotating shell, or they would rotate inside the stationary dome of the housing 205. One or more optical element structures 209 may be positioned in front of the light emitting unit 204 and/or the detector 208 to serve as one or more lenses or waveplates that focus and direct light that is passed through the optical element structure 209.

Figure 3B:
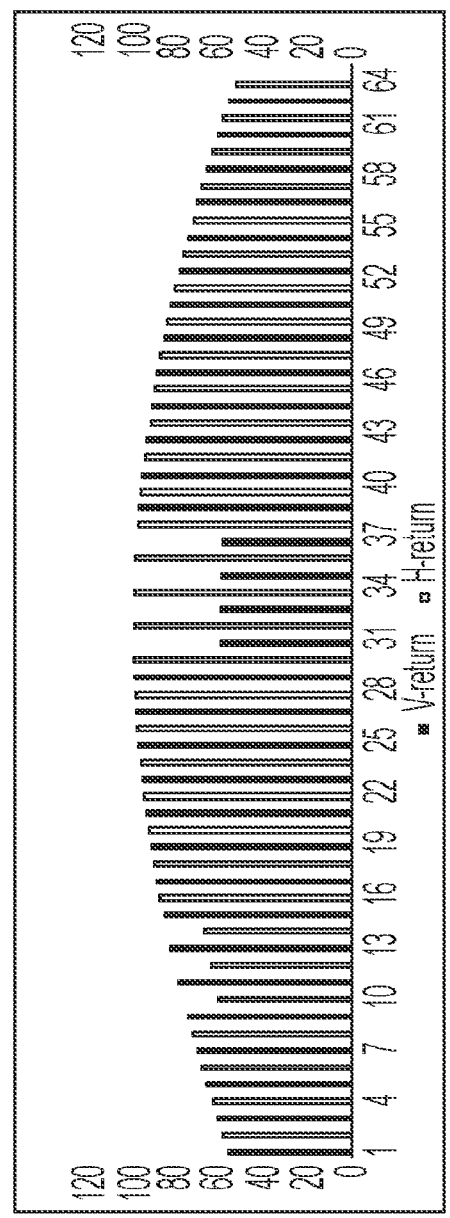
FIG. 3B shows a possible pattern of received laser beams.

FIG. 3B shows an example pattern of received laser beams. Between beams number 9 and 16 the alternating intensity pattern shows that these beams reflected off a tilted surface with a moderate angle of incidence. Beams between 30 and 38 show a stronger modulated alternating pattern, which is due to reflection of another surface with larger angle of incidence. Optionally, the detector (208 of FIG. 2) may be equipped with optical elements that will separate the received light into two orthogonal states of polarization, such as vertical and horizontal polarization. Then a detector can detect each state of polarization (such as that shown in FIG. 3B), and the number of detectors will be the twice the number of emitters. For example, a system with 32 laser beams would be equipped with 64 receiver channels.

Returning again to FIG. 2, the LiDAR system will include a power unit 221 to power the light emitter unit 204, a motor 223 that can turn the axle 218, the housing 205 or other components, and electronic components. The LiDAR system will also include an analyzer 215 with elements such as a processor 222 and non-transitory computer-readable memory 223 containing programming instructions that are configured to enable the system to receive data collected by the light detector unit, analyze it to measure characteristics of the light received, and generate information that a connected system can use to make decisions about operating in an environment from which the data was collected. Optionally, the analyzer 215 may be integral with the LiDAR system 201 as shown, or some or all of it may be external to the LiDAR system and communicatively connected to the LiDAR system via a wired or wireless communication network or link. For example, the motor 223 may be integral with the LiDAR system, but the processor 222 and/or memory 223 may be remote from the other components.

As noted above, one structure from which the emitter system may emit multiple laser beams includes devices such as emitter chips, in which each emitter chip emits light from the single system. Additionally, although most lasers emit polarized light, in some embodiments the light beams may be unpolarized. With unpolarized light, the electric field vectors of the light will vibrate in some or all planes that are perpendicular to the direction of propagation of the light. In contrast, the electric field vectors of polarized light will vibrate in a limited plane or direction. Polarized light exists in several different forms, some of the forms being linearly polarized in a single plane, others being radially polarized (i.e., circularly polarized or elliptically polarized) in a single direction of rotation (e.g., right-handed or left-handed). The use of polarized light beams in a LiDAR system gives the LiDAR system a known polarization to use for an analysis when comparing the emitted light to the received light. Most of the energy in backscattered light will have a polarization that is directly related to the polarization of the emitted light. In particular, if the transmitted light is linearly polarized, the backscattered radiation will be expected to primarily retain the polarization of the transmitted light. However, if the emitted light is circularly polarized, then the polarization of the backscattered radiation will be expected to be reversed, i.e., right handed circular will be converted into left handed circular and vice versa. Therefore, if the polarization of the received light substantially matches the expected polarization, or if a depolarization ratio of the received light is near zero (in which the denominator of the ratio is the backscatter intensity of the portion of the backscatter's orientation that matches the polarization of the emitted light), the LiDAR system may consider the received light to be a reflection of the emitted light. As described below in the context of FIG. 8, the system may use the intensity pattern of the received light as a proxy to assess whether or not the polarization patterns match.

Figure 4:
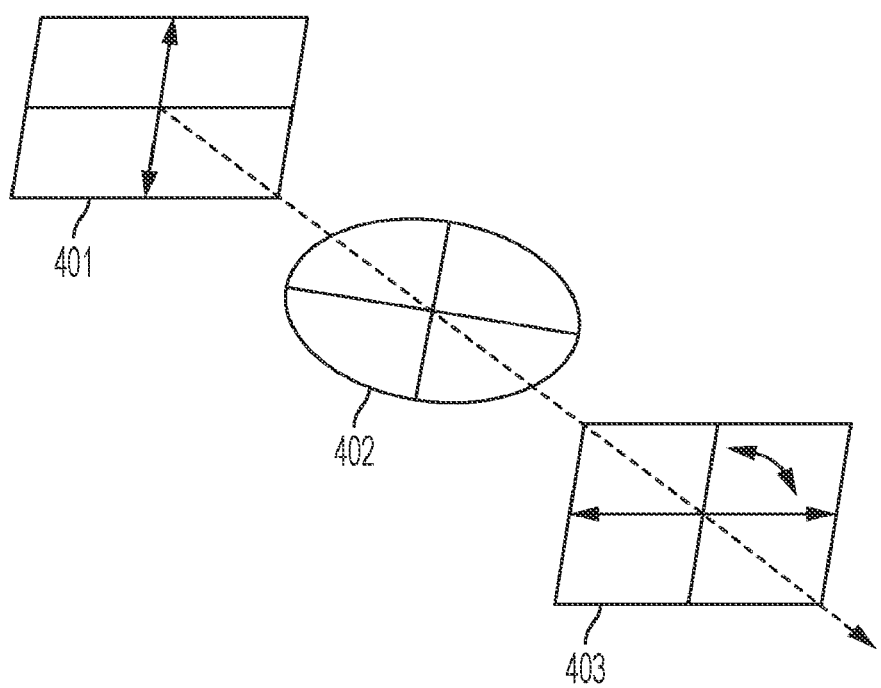
FIG. 4 illustrates how a waveplate may operate as a polarization modifier for light.

To help reduce the problem of "ghosts" described in the Background section of this document, the LiDAR system may also include a polarization modifier. The polarization modifier will be positioned and configured to alter the polarization of some, but not all, light beams emitted by the system. As illustrated in FIG. 4, the polarization modifier may include any number of waveplates 402 that receives light exhibiting a first polarization 401 and alters the light so that it exhibits a different polarization 403. Example waveplates include a half-wave plate that changes the polarization direction of linearly polarized light (as shown in FIG. 4), or a quarter-wave plate that converts linearly polarized light into circularly polarized light or elliptically polarized light.

Figure 5:
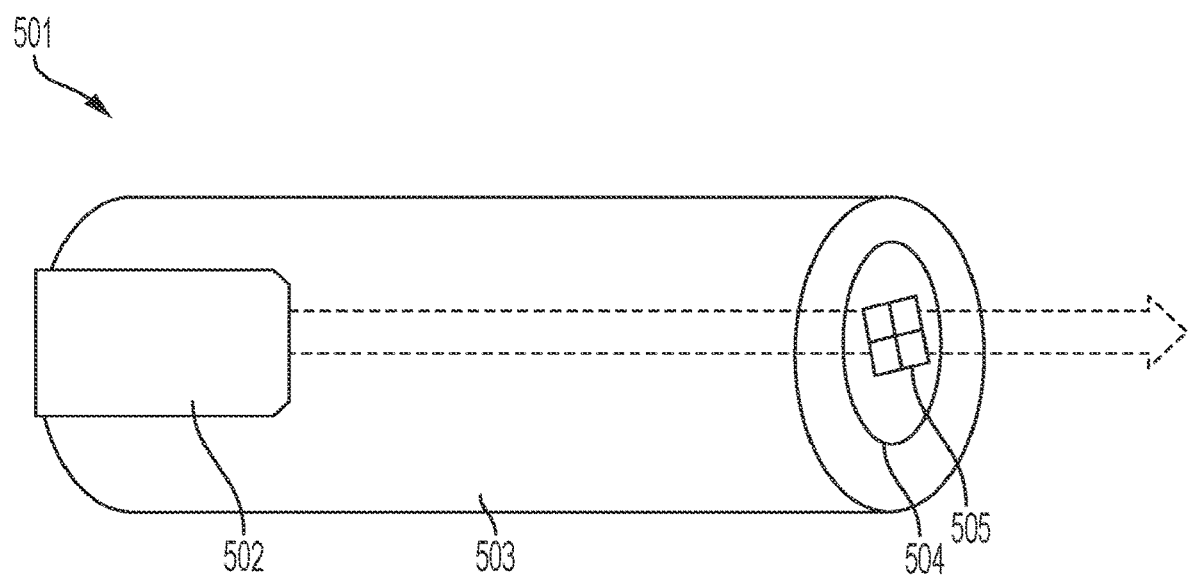
FIG. 5 illustrates an example of a diode laser with a waveplate that serves as a polarization modifier.

Such a waveplate may be positioned on or within the output of each light emitter to which the waveplates are attached. For example, as shown in FIG. 5, if a diode laser 501 is the light emitter, light emitted from a light-emitting diode 502 may exit the emitter's housing 503 via a lens 504. The lens 504 may include the polarization modifier 505 (which may be a waveplate) either integrally or placed over or under the lens structure, to alter the polarization of the laser beam as it exits the housing 503. The waveplates may be placed over some portion, such as half, of the emitters, while the remaining emitters may have no waveplates. Alternatively, two types of waveplates may be used so that one portion (e.g., half) of the emitters emit light of a first polarization while the remaining portion (e.g., the other half) of the emitters emit light of a second (different) polarization.

By way of example, if the polarization modifier consists of half-wave plates modifier are used with half of the light emitters, the emitted beams may exhibit a beam polarization pattern that contains half vertically polarized laser beams and half horizontally polarized light beams.

In addition or alternatively, the polarization modifier may include quarter-wave plates which alter the polarization state of the light beams by introducing a phase shift. This phase shift may be used to convert linearly polarized light to circularly or elliptically polarized light, or vice versa. For example, mounting a quarter-wave waveplate to a laser emitter that emits vertically polarized laser beams results in circularly polarized or elliptically polarized laser beams depending on the orientation of the quarter-wave plate. The orientation of the quarter-wave plate can be varied to obtain right-handed circularly, left-handed circularly, right-handed elliptically, or left-handed elliptically polarized light. Additionally, right-handed circularly, left-handed circularly, right-handed elliptically, or left-handed elliptically polarized light may be obtained by using a combination of quarter-wave waveplates and half-wave waveplates.

Figure 6A:
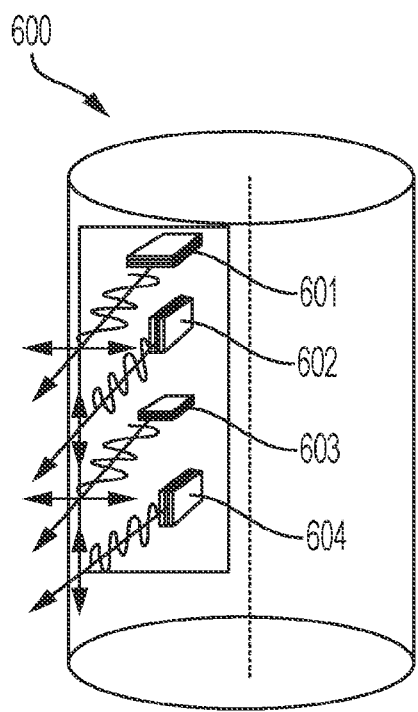
FIG. 6A shows an example LiDAR system in which light emitter chips are mounted in alternating orientations. In comparison.
Figure 6B:
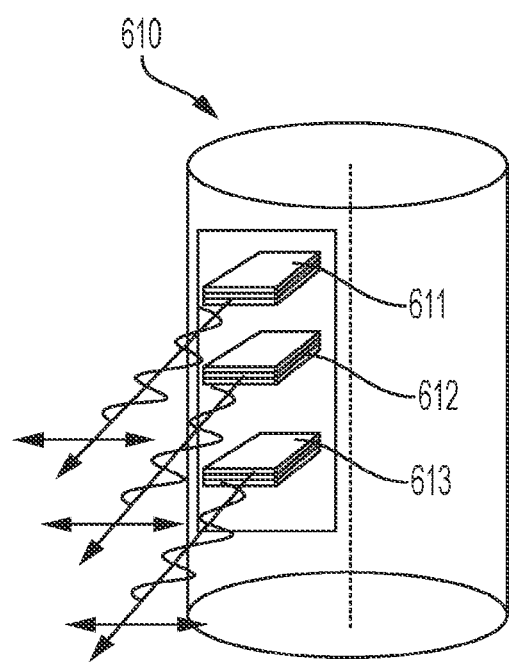
FIG. 6B shows a conventional arrangement in which all emitter chips are positioned to emit light having a single, common polarization.

Alternatively, or in addition, since laser emitters each may emit a polarized laser beam, changing the orientation of the way some of the laser emitters are mounted to the overall light emitter system can change the polarization of those laser beams. For example, in some embodiments, laser emitters may emit vertically polarized laser beams when mounted to the laser unit in a first orientation. Changing the mounted orientation of the laser emitters to an orientation that is perpendicular to the first orientation may result in the laser emitters emitting horizontally polarized laser beams. In this way, the laser emitters may be configured to emit multiple laser beams that have the same polarization, or multiple laser beams that have one or more different polarizations. Corresponding mounting arrangements may be used with other types of light emitters as well. For example, FIG. 6A shows an example LiDAR system 600 in which light emitter chips are mounted in alternating orientations, such that light emitter chips 601 and 603 are positioned to emit light having a horizontal polarization, while light emitter chips 602 and 604 are positioned to emit light having a vertical polarization. Thus, each emitter chip that is positioned to emit light of a first polarization (vertical or horizontal) will be positioned adjacent to at least one emitter chip that is positioned to emit light of the other polarization. By way of comparison, FIG. 6B shows a conventional LiDAR system 610 in which all emitter chips 611-613 are positioned to emit light having a single, common polarization.

Figure 7:
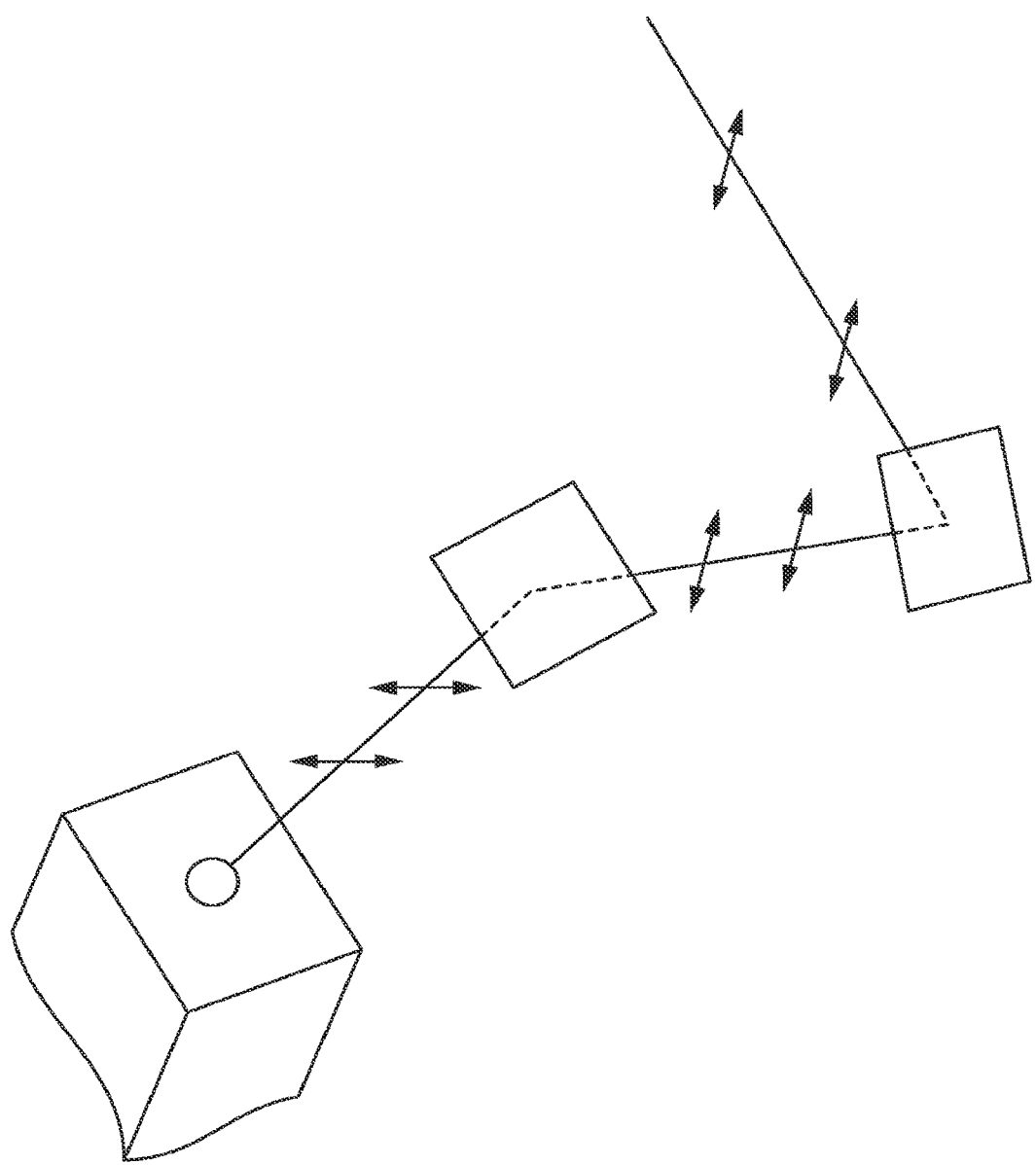
FIG. 7 illustrates an embodiment in which a set of beam-steering mirrors serves as polarization modifier.

Since light reflection alters the polarization of the light, one or more beam-steering mirrors may be mounted in front of a light emitter to change the polarization of a portion of the light beams. For example, referring to FIG. 7, mounting one or more mirrors 705, 706 to or in front of a laser emitter 701 that emits vertically polarized laser beams 702 reflect the beams and result in horizontally polarized laser beams 704 being emitted toward an object. Therefore, similar to the half-wave waveplates, the mirrors 704, 706 may be used in place of changing the mounting orientation of a portion of the laser emitters, or they may be used in conjunction with changing the mounting orientation of a portion of the laser emitters. In some embodiments, all of the laser emitters may be mounted to the laser unit in the same orientation. The mirrors of the polarization modifier may be mounted to or positioned in front of a portion of the laser emitters, resulting in a polarization beam pattern that contains a portion of vertically polarized laser beams and a portion of horizontally polarized laser beams.

Regardless of the structure of the polarization modifiers used, they may be used to impart a 90° rotation (or other modification) to the polarization of the light emitted by the emitters to which they are attached. The polarization modifiers may be applied to the light emitters in any determined pattern, such as every other emitter (e.g., "even" emitters have a polarization modifier while "odd" emitters do not, or vice versa), in groups (e.g., two emitters with polarization modifiers followed by two emitters without), or in other patterns. The pattern of application of polarization modifiers may vary, for example applied only to emitters in a lower segment of the array (from whose lasers are more likely to generate ghost reflections).

The above examples described static (i.e., physically fixed) polarization modifiers. In other embodiments, the polarization modifiers may include one or more optical elements that operate in dynamic manner.

Figure 8:
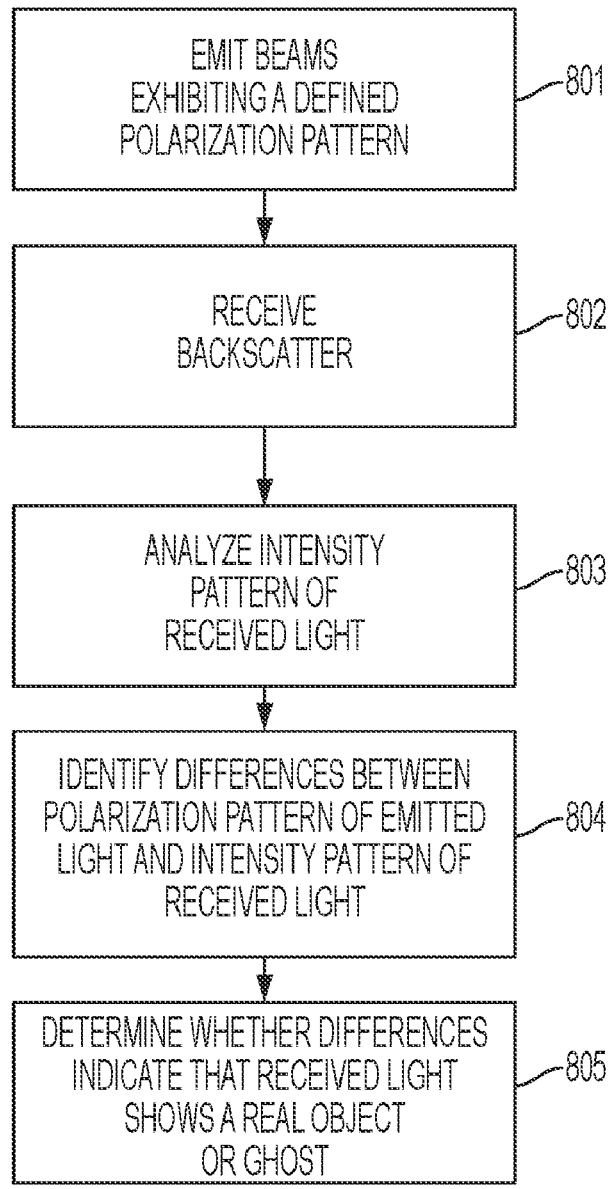
FIG. 8 illustrates an example method of using beam polarization patterns to distinguish a real object from a "ghost" in light received via a LiDAR system.

Knowledge of the pattern will help the system distinguish a real object from a "ghost" image. Referring to FIG. 8, the system will emit a group of light beams toward an object in which each of the beams exhibits a known intensity (which may be the same across all beams, or which may vary across beams), and the beams' polarizations will vary, resulting in a known polarization pattern (step 801). The beams will be reflected from that object, and the backscattered light will be received by the LiDAR system's receiver (step 802). Unlike that of the emitted beams, the intensities of the reflected and received beams will vary, and the received light will thus exhibit a polarization modified intensity pattern. The LiDAR system's processor may execute programming instructions that cause the system's analyzer to analyze the intensity pattern of the received light (step 803) and determine characteristic differences (step 804) between the polarization pattern of the light emitted toward the object and the intensity pattern of the received light. When the emitted light beams reflect from an object, the received beams' intensity pattern will not correspond to the polarization pattern of the emitted beams.

For example, if emitted light includes only horizontally and vertically polarized beams, the light reflected from the object may be rotated 90 degrees before being received by the receiver. If the system receives light with this difference in its polarization orientation characteristic, it may presume that the light reflected from the object. In the same example, if the horizontally and vertically polarized beams are reflected from a surface (typically one with a large angle of incidence) to an object and back to the surface (e.g., from the hood of a vehicle, to an object, and then back to the hood of the vehicle), which is the case for a ghost, the light will be received in an orientation similar to or the same as the orientation of the emitted light. Thus, when determining the characteristic difference, in this example the lack of substantial difference (or in other words, the substantial similarity) may indicate that the reflection is a ghost rather than an object. In this document, the term "characteristic difference" is intended to include both situations where the system determines whether the beams' characteristics differ, as well as situations where the system looks for similarity (i.e., lack of difference) in the beams' characteristics.

Additionally, by using the time from emitting the beams of light to receiving the reflected beams of light, the processor and programming instructions may be used to determine the reflection position that is associated with the light reflected from the object. Knowing that a received beam intensity pattern that is the same as the emitted polarization pattern represents reflection from a ghost, the processor of the analyzer uses the determined characteristic differences to determine whether the reflection position is a position of the object or a position of a ghost (step 805). If the intensity pattern of the received light corresponds to the polarization pattern of the emitted light, the processor will conclude that the reflection is from a ghost. Otherwise, if the intensity pattern of the received light does not correspond to the polarization pattern of the emitted light (as shown, for example, in FIGS. 3A and 3B) the processor will conclude that the reflection is from the object.

In some embodiments, the receiver of the LiDAR system (such as detector 208 of FIG. 2) may include a polarization beam splitter. A polarization beam splitter is an optical device that splits a beam of light. The polarization beam splitter may be used to separate light, such as two forms of light that have perpendicular orientations (e.g., vertically and horizontally polarized light), which helps determine whether the received light has the same polarization as the transmitted light or whether the polarization has been affected by reflections from various surfaces.

For example, in some embodiments, the receiver has one or more receiver channels. Each receiver channel may be configured to detect one type of polarized light, such as vertically polarized light. So for a receiver to detect vertically polarized light and horizontally polarized light, at least two receiver channels are needed. The receiver can convert the received light to an electrical signal, and the strength of the electrical signal may be used to determine if the received light was mostly vertically polarized or mostly horizontally polarized. The analyzer may then use this information to determine characteristic differences between the emitted beam polarization pattern and the light reflected from the object.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of analyzing data by a sensor system, the method comprising:
    analyzing, by a processor, characteristics of beams of reflected light received by the sensor system, wherein the beams of the reflected light correspond to beams of light directed toward an object; and
    determining, by the processor using the characteristic of an intensity pattern of the beams of the reflected light, whether a reflection position is a position of the object or not,
    wherein if the characteristic of the intensity pattern is continuity of the intensity pattern, the reflection position is not the position of the object,
    wherein the beams of emitted light have substantially the same intensity, and
    wherein the characteristics of the beams of the reflected light include a similarity of a polarization pattern as the beams of emitted light or a lack of difference of the polarization pattern than the beams of the emitted light.

2. The method of claim 1, wherein the beams of emitted light have a well-defined state of polarization that is not the same across an entire array.

3. The method of claim 1, wherein analyzing characteristics of beams of reflected light further comprises:
    analyzing a substantially similarity of a polarization of a received light with an expected polarization, or whether a depolarization ratio of the received light is near zero, and
    wherein the received light is the reflected light received by sensor system.

4. The method of claim 1, further comprising:
    modifying, using a polarization modifier, polarization of a subset of the beams of the emitted light to create the polarization pattern.

5. The method of claim 4, wherein modifying the polarization of the subset of the beams further comprises:
    mounting a quarter-wave waveplate to a laser emitter that emits polarized laser beams by varying an orientation of the quarter-wave plate, and
    wherein the polarization modifier comprises the quarter-wave plate.

6. The method of claim 4, wherein modifying the polarization of the subset of the beams further comprises:
    mounting a plurality of half-wave plates to a laser emitter that emits polarized laser beams.

7. The method of claim 1, further comprising:
changing an orientation of some portion of laser emitters mounted to within a housing of the sensor, polarization of a subset of the beams of the emitted light to create the polarization pattern.

8. The method of claim 7, wherein changing the orientation of some portion of laser emitters further comprises:
mounting a first portion of the laser emitters within the housing of the sensor system in a first orientation; or
mounting a second portion of the laser emitters within the housing in a second orientation that is different from the first orientation.

9. The method of claim 1, further comprising:
filtering, by the processor, the reflected light determined as the reflection position is not the position of the object.

10. The method of claim 4, wherein modifying the polarization of the subset of the beams further comprises:
mounting a plurality of beam-steering mirrors to a portion of laser emitters that emits polarized laser beams; or
positioning the plurality of the beam-steering mirrors in front of the portion of the laser emitters that emits polarized laser beams, and
wherein the polarization modifier comprises the plurality of the beam-steering mirrors.

11. The method of claim 1, further comprising:
splitting, using a polarization beam splitter, a received light into vertical and horizontal polarizations,
wherein the received light is the reflected light received by sensor system, and
wherein the sensor system comprises the polarization beam splitter.

12. The method of claim 1, further comprising:
determining, by the processor, characteristic differences between a polarization pattern of the beams of the emitted light and the intensity pattern of the beams of the reflected light; and
using the determined characteristic differences to determine whether the reflection position is the position of the object or a position of a ghost.

13. The method of claim 12, wherein using the determined characteristic differences to determine whether the reflection position is the position of the object or the position of the ghost comprises:
if the polarization pattern of the beams of the emitted light substantially corresponds to the intensity pattern of the beams of the reflected light, determining that the reflection position is the position of the ghost; and
if the polarization pattern of the beams of the emitted light does substantially not correspond to the intensity pattern of the beams of the reflected light, determining that the reflection position is the position of the object.

* * * * *